No. 617,138.　　　　　　　　　　　　　　Patented Jan. 3, 1899.
A. R. ANTHONY.
CONVEYER DRIVE CHAIN.
(Application filed May 14, 1898.)

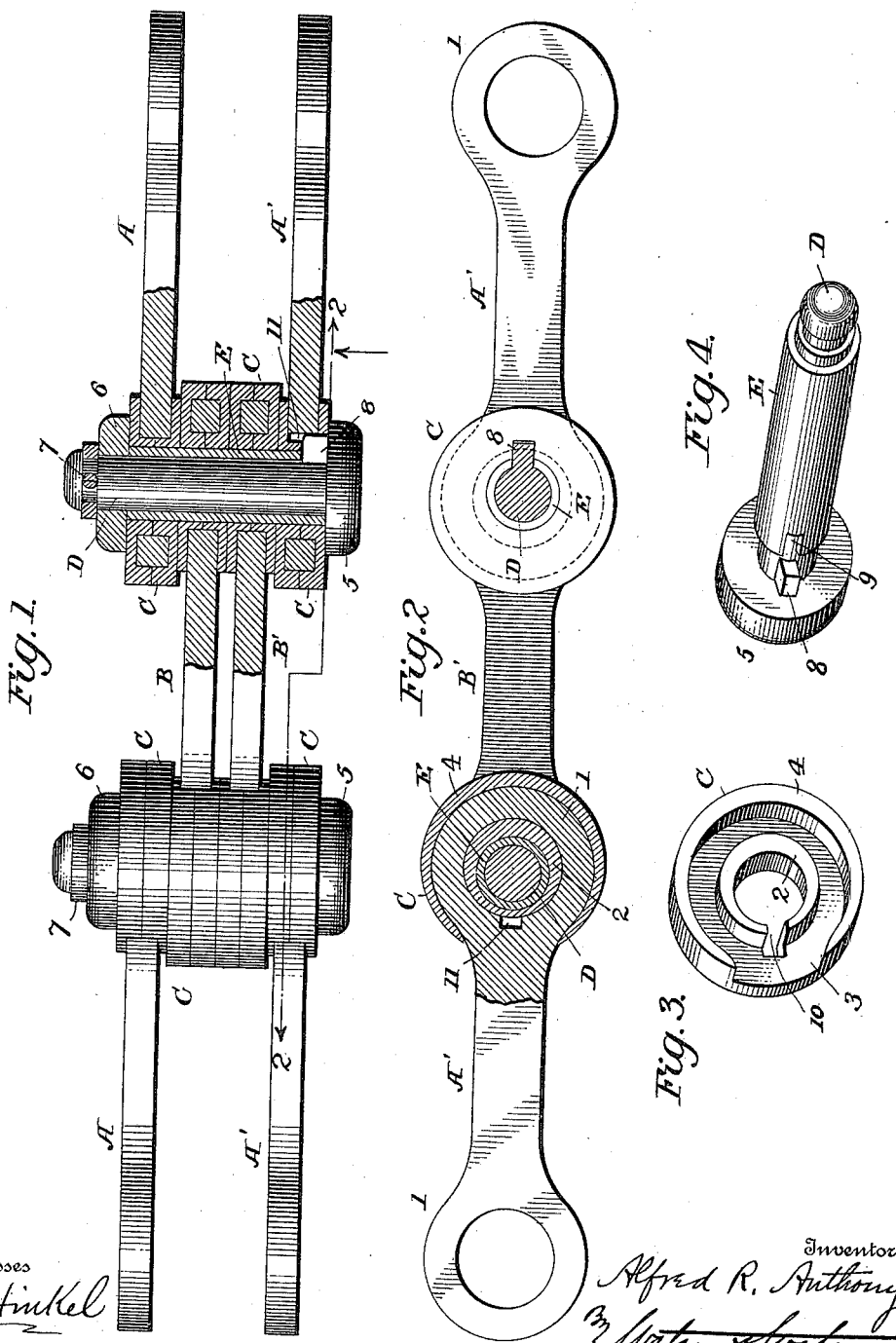

(No Model.)　　　　　　　　　　　　　　2 Sheets—Sheet 2.

Witnesses　　　　　　　　　　　　　　Inventor
J. G. Hinkel　　　　　　　　　　　　　Alfred R. Anthony
William E. Neff　　　　　　　　　　　By Watson & Watson
　　　　　　　　　　　　　　　　　　　　Attorney

UNITED STATES PATENT OFFICE.

ALFRED ROWAN ANTHONY, OF WILKES-BARRÉ, PENNSYLVANIA.

CONVEYER DRIVE-CHAIN.

SPECIFICATION forming part of Letters Patent No. 617,138, dated January 3, 1899.

Application filed May 14, 1898. Serial No. 680,695. (No model.)

*To all whom it may concern:*

Be it known that I, ALFRED ROWAN ANTHONY, a citizen of the United States, residing at Wilkes-Barré, in the county of Luzerne and State of Pennsylvania, have invented certain new and useful Improvements in Conveyer Drive-Chains, of which the following is a specification.

This invention relates to improvements in chains and is particularly applicable to drive-chains and chains of various kinds of conveyers.

The invention consists particularly in improvements to increase the life of the chain and facilitate making repairs.

Figure 5:
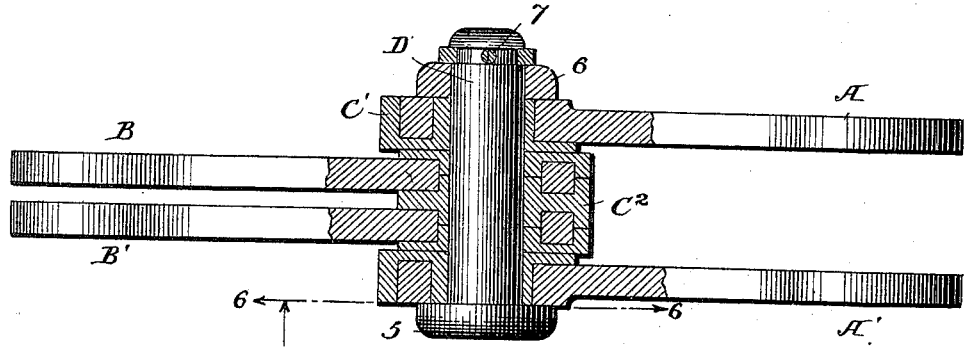
Figure 6:
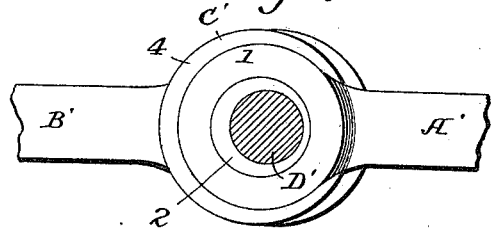
Figure 8:
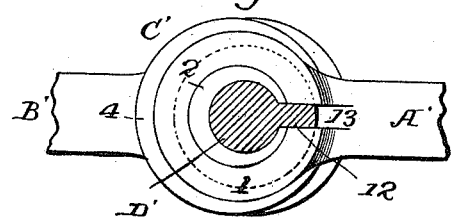
Figure 7:
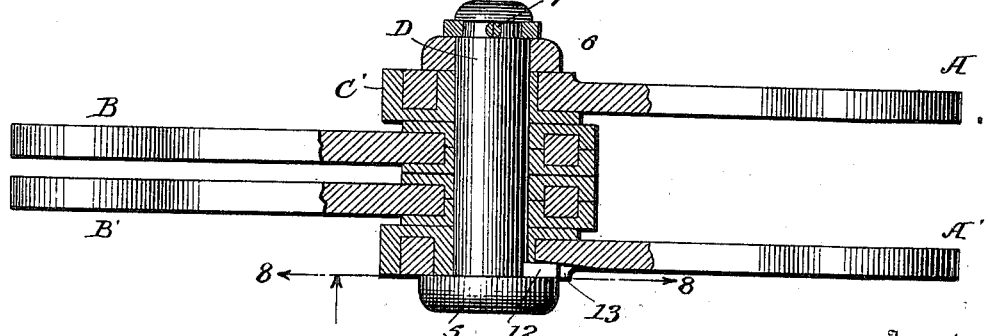

In the accompanying drawings, Figure 1 is a plan view of a portion of the chain, parts being shown in section to illustrate the interior construction. Fig. 2 is a side view of the same, partly in section, on the line 2 2 of Fig. 1. Fig. 3 is a perspective view of one of the link-head protectors. Fig. 4 is a perspective view of a chain-pin and a removable bushing. Figs. 5 and 7 are side views of portions of chains, partly in section, showing modified constructions. Figs. 6 and 8 are sections on the lines 6 6 and 8 8 of Figs. 5 and 7.

Referring to Figs. 1 to 4, inclusive, of the drawings, A A' indicate the outer links and B B' the inner links of a chain embodying my invention. The number of links in the chain and the particular purpose to which it is to be applied are immaterial so far as my present invention is concerned. The invention is, however, particularly applicable to drive-chains and conveyer-chains. The heads 1 of the links are protected on all their wearing-surfaces by link-head protectors C, one of which is illustrated in Fig. 3. These protectors consist of bushings 2, facings 3, and outer flanges 4. These protectors completely cover the head of the link, the bushing being inserted in the eye and the outer flange encircling the periphery of the head in so far as it may be subjected to wear. The bushings and the flanges are preferably thicker at the places where they are most subjected to wear, the bushings being subject to wear upon the chain-pins and the flanges being subject to wear by contact with the driving-sprockets. These link-head protectors may be formed in two parts for each link-head, as shown in Fig. 1, or they may be differently formed, as will be hereinafter explained.

The chain-pins D are formed with fixed heads 5 and removable heads 6, the removable heads being retained by suitable cotter-pins 7. I preferably protect the pins by surrounding them with sleeves E, the sleeves being prevented from turning on the pins by means of a fixed key or projection 8, which enters a notch 9 in the sleeve. The key 8 may be made large enough to enter a notch 10 in the link-head protector and a similar notch 11 in the link itself, thereby causing the pin, the sleeve, and the outer links to turn together. The link-head protectors and the sleeves E are constructed of metal which may be hardened, such as steel. The pins may also be of hardened metal, if desired. It will be seen that the pins and the links are not subject to wear. They may therefore be used indefinitely. The outer link-head protectors also are not subject to wear if the chain is constructed as shown in Fig. 1, and in some instances they may be omitted. The sleeve and the link-head protectors which become worn can be quickly removed and replaced when necessary, and the pins and links can be used indefinitely.

In Fig. 5 I have shown a modified construction in which the outer links have a single protector C' and the inner links have a common protector C² between them. In this figure the pin D' is not provided with a sleeve and it is free to turn in all the links. The links are fully protected and may be used indefinitely, while the pins, if made of hardened steel, will last for a long time.

In Fig. 7 the construction is the same as that shown in Fig. 5, excepting that the middle links have independent protectors and the pin is provided with a key 12, which enters a slot 13 in the outer link and a notch in the protector of the link, thereby causing the outer links to move with the pin.

Having described my invention, what I claim, and desire to secure by Letters Patent, is—

1. In a drive or conveyer chain, a removable link-head protector comprising a bushing, a facing and an outer flange, substantially as described.

2. In a drive or conveyer chain the combination with the links, of removable bushings within the eyes of the links, removable facings between the links, and flanges connected with the facings and surrounding the outer portions of the link-heads which are subjected to wear, whereby the link-heads are entirely protected from wear, substantially as described.

3. In a drive or conveyer chain the combination of links, removable bushings within the eyes of said links, chain-pins and removable sleeves upon said pins, substantially as described.

4. In a drive or conveyer chain the combination with the links, of removable hard-metal protectors covering the wearing portions of the link-heads, the chain-pins, and removable sleeves covering said pins, substantially as described.

In testimony whereof I affix my signature in presence of two witnesses.

ALFRED ROWAN ANTHONY.

Witnesses:
J. A. WATSON,
GEO. E. TERRY.